(12) United States Patent
Vermeulen et al.

(10) Patent No.: US 12,484,838 B2
(45) Date of Patent: Dec. 2, 2025

(54) LARGE DYNAMIC RANGE DETECTOR FOR GINGIVITIS DETECTION

(71) Applicant: KONINKLIJKE PHILIPS N.V., Eindhoven (NL)

(72) Inventors: Olaf Thomas Johan Antonie Vermeulen, Oss (NL); Alan James Davie, Cambridge (GB); Steven Charles Deane, Cambridge (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 972 days.

(21) Appl. No.: 17/275,035

(22) PCT Filed: Sep. 2, 2019

(86) PCT No.: PCT/EP2019/073322
§ 371 (c)(1),
(2) Date: Mar. 10, 2021

(87) PCT Pub. No.: WO2020/053011
PCT Pub. Date: Mar. 19, 2020

(65) Prior Publication Data
US 2022/0054079 A1   Feb. 24, 2022

Related U.S. Application Data

(60) Provisional application No. 62/729,455, filed on Sep. 11, 2018.

(51) Int. Cl.
*A61B 5/00* (2006.01)
*G02B 6/42* (2006.01)

(52) U.S. Cl.
CPC .......... *A61B 5/4552* (2013.01); *A61B 5/0075* (2013.01); *A61B 5/0088* (2013.01); *G02B 6/4215* (2013.01)

(58) Field of Classification Search
CPC ... A61B 5/0075; A61B 5/0088; A61B 5/4552; A61B 5/7225; A61B 5/4542; A61B 5/4538; G02B 6/4215
See application file for complete search history.

(56) References Cited

U.S. PATENT DOCUMENTS 9,259,486 B2 * 2/2016 Koenig ............... A61B 5/445
2002/0107448 A1 * 8/2002 Gandjbakhche ..... A61B 5/0088
600/476

(Continued)

FOREIGN PATENT DOCUMENTS

| WO | 2001052723 A1 | 7/2001 |
| WO | 2015069704 A1 | 5/2015 |
| WO | 2015176999 A1 | 11/2015 |

OTHER PUBLICATIONS

International Search Report and Written Opinion, International Application No. PCT/EP2019/073322, Mailed on Nov. 14, 2019.

(Continued)

*Primary Examiner* — Michael J Carey
*Assistant Examiner* — Maria Christina Talty

(57) ABSTRACT

A system (100) for detecting tissue inflammation, gingivitis specifically, including a light emitter (102) configured to emit light at a tissue region within a user's mouth; at least four wavelength-sensitive photodetectors (110, 112, 114, and 116) configured to detect optical signals diffusely reflected through the tissue region, each of the at least four wavelength-sensitive photodetectors comprising a filter (BPF1, BPF2, BPF3, and BPF4) and a photodiode (D1, D2, D3, and D4), where the photodiodes are stacked on top of each other to generate current differential signals for amplifiers corresponding with the photodiodes, wherein the generation of the current differential signals removes an unwanted component from the optical signals prior to amplification; and an inflammation detection unit (136) config- (Continued)

ured to receive outputs from the corresponding amplifiers and detect inflammation at the tissue region.

20 Claims, 4 Drawing Sheets

(56) References Cited

U.S. PATENT DOCUMENTS

| | | | | |
|---|---|---|---|---|
| 2008/0090199 | A1* | 4/2008 | Noguchi | A61B 5/0066 433/29 |
| 2013/0323673 | A1* | 12/2013 | Hakomori | A61B 1/00009 433/29 |
| 2014/0072932 | A1* | 3/2014 | Brawn | A61C 19/06 433/215 |
| 2016/0038033 | A1* | 2/2016 | Lal | A61B 5/6887 433/29 |
| 2016/0038076 | A1 | 2/2016 | Muller | |
| 2016/0051147 | A1* | 2/2016 | Cohen | A61B 5/4875 600/473 |
| 2016/0270716 | A1* | 9/2016 | Guan | A61B 1/000094 |
| 2018/0078151 | A1* | 3/2018 | Allec | A61B 5/6801 |
| 2019/0115995 | A1* | 4/2019 | Sahni | G02B 6/272 |

OTHER PUBLICATIONS

Hanioka, T. et al., "Hemoglobin concentration and oxygen saturation of clinically healthy and inflamed gingiva in human subjects", J. Periodontal Res. 25: 93-98, 1990.

Meyers, D. et al., "Noninvasive method for measuring local hemoglobin oxygen saturation in tissue using wide gap second derivative near-infrared spectroscopy", J. of Biomedical Optics, 10(3), 034017 (2005).

Jiwei Huang (2013) Multispectral Imaging of Skin Oxygenation, Dissertation, Ohio State University.

* cited by examiner

LARGE DYNAMIC RANGE DETECTOR FOR GINGIVITIS DETECTION

This application is the U.S. National Phase application under 35 U.S.C. § 371 of International Application No. PCT/EP2019/073322, filed on 2 Sep. 2019, which claims the benefit of U.S. Provisional Application No. 62/729,455, filed 11 Sep. 2018. These applications are hereby incorporated by reference herein.

FIELD OF THE INVENTION

The present disclosure is directed generally to a front-end for detecting tissue inflammation, and gingivitis specifically, using diffuse reflective spectroscopy technology.

BACKGROUND

Gingivitis detection using diffuse reflective spectroscopy (DRS) is currently performed with small, angled probes configured around one or more optical fibers which transport light due to the limited space in an oral cavity. Such small probes are useful for measuring at the interproximal areas where gingivitis commonly originates. However, when in contact, such small probes can exert a large pressure on the tissue, pushing away the blood and thereby disrupting the DRS measurement of blood properties. Thus, DRS measurements are preferably taken in non-contact mode and the required non-contact mode leads to detecting specular reflected light in addition to the desired diffuse reflected component. Since diffuse reflected light (i.e., light propagated through tissue) is highly attenuated, these specular components can become relatively large.

Furthermore, an important property of the probe is the source-detection separation because it influences the sampling depth of the probe (i.e., from how deep in the tissue the measured light originates). However, the source-detection separation increases the risk of illuminating and/or detecting light from non-gingival tissue, e.g., teeth and or dental implants. For example, because the papilla ends in a small tip-like shape, it is likely that, due to the fiber separation, the desired papilla signal is at least partially contaminated with tooth enamel signals. Since teeth and/or dental implants/restorations predominantly show a white/yellowish color, the false teeth reflection will add a direct current (DC)-like offset to the DRS signal that contains no information with respect to gingivitis detection (i.e. hemoglobin concentrations). This false signal occupies part of the dynamic range. Typically, such false signals are removed by suitable signal processing after amplification and/or analog-to-digital conversion requiring large dynamic range and analog-to-digital converter resolution.

Accordingly, there is a need in the art for inventive oral healthcare systems and methods for enabling accurate detection of tissue inflammation, and gingivitis specifically, using a DRS front-end that removes the large offset part before amplification and/or analog-to-digital (AD) conversion, thereby relaxing the demands on the electronics.

SUMMARY OF THE INVENTION

The present disclosure is directed to inventive systems and methods for detecting tissue inflammation, and gingivitis specifically, using diffuse reflective spectroscopy (DRS). Various embodiments and implementations herein are directed to a gingivitis detection system including a front-end that provides a large dynamic range and removes specular and DC components directly (i.e., at the sensor, before sensor front-end electronics). The gingivitis detection system includes a specialized configuration of a light emitter, four or more wavelength-sensitive photodetectors, and a tissue inflammation detection system.

Generally, in one aspect, a system for detecting tissue inflammation is provided. The system includes a light emitter configured to emit light at a tissue region within a user's mouth; at least four wavelength-sensitive photodetectors configured to detect optical signals diffusely reflected through the tissue region, each of the at least four wavelength-sensitive photodetectors comprising a filter and a photodiode, where the photodiodes are stacked on top of each other to generate current differential signals for amplifiers corresponding with the photodiodes, wherein the generation of the current differential signals removes an unwanted component from the optical signals prior to amplification; and an inflammation detection unit configured to receive outputs from the corresponding amplifiers and detect tissue inflammation at the tissue region. In various embodiments, the tissue inflammation is gingivitis.

In one embodiment, the light emitter and the at least four wavelength-sensitive photodetectors are embodied in a DRS probe having a source-detection distance between 300 µm-2000 µm.

In one embodiment, the system further includes a splitter configured to distribute the reflected light over the at least four wavelength-sensitive photodetectors.

In various embodiments, the splitter is a fused fiber splitter, a dispersive splitter, or a light guide manifold.

In one embodiment, the light emitter is a phosphor-converted white LED.

In one embodiment, the filter for each of the at least four wavelength-sensitive photodetectors is a bandpass filter.

In one embodiment, the current differential signals for the photodiodes are in increasing magnitude.

In one embodiment, the current differential signals for the photodiodes include first, second, and third current differential signals for photodiodes, respectively, where the second current differential signal is greater than the first and third current differential signals.

In one embodiment, the stacked photodiodes form a stack having a bottom photodiode and the bottom photodiode is terminated with a current source controlled in a closed loop.

In one embodiment, the stacked photodiodes form a stack having a bottom photodiode and the bottom photodiode generates a photocurrent at a level to minimize a largest differential signal to be minimized.

Generally, in another aspect, a method for detecting tissue inflammation including a front-end is provided. The method includes emitting light by a light emitter towards a tissue region in a user's mouth; detecting, via at least four wavelength-sensitive photodetectors optical signals diffusely reflected through the tissue region, each of the at least four wavelength-sensitive photodetectors comprising a filter and a photodiode, where the photodiodes are stacked on top of each other to generate current differential signals for amplifiers corresponding with the photodiodes, wherein the generation of the current differential signals removes an unwanted component from the optical signals prior to amplification; inputting outputs of the amplifiers to an AD converter; and inputting outputs of the AD converter to a tissue inflammation detection unit. In various embodiments, the tissue inflammation is gingivitis.

In one embodiment, the detecting step further includes distributing the reflected light over the at least four wavelength-sensitive photodetectors with a splitter.

In one embodiment, the splitter is a fused fiber splitter, a dispersive splitter, or a light guide manifold.

As used herein for purposes of the present disclosure, the term "controller" is used generally to describe various apparatus relating to the operation of an imaging apparatus, system, or method. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

Figure 1A:
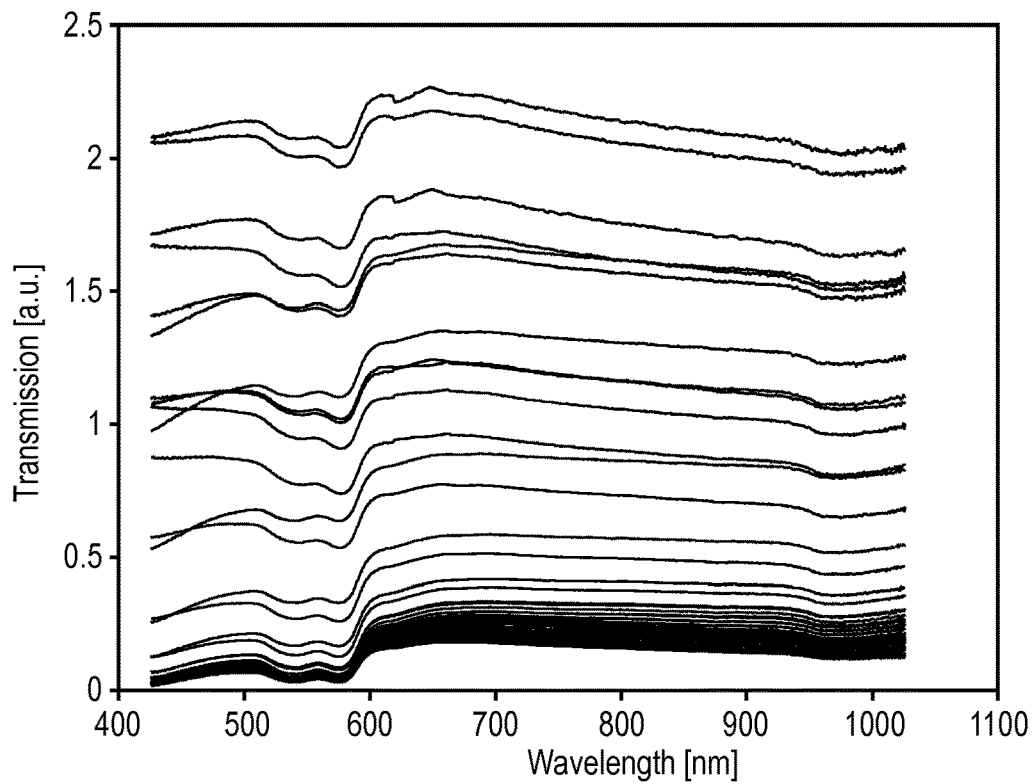
FIG. 1A is a graph of diffuse reflective spectroscopy spectra measured with different probe-to-target angles, in accordance with an embodiment.

The present disclosure describes various embodiments of systems and methods for improved detection of tissue inflammation, and gingivitis specifically, using diffuse reflected light. More generally, Applicant has recognized and appreciated that it would be beneficial to provide a system to remove large offsets at the earliest possibility after acquiring a diffuse reflective spectroscopy signal. Accordingly, the systems and methods described or otherwise envisioned herein provide an oral healthcare device configured to obtain measurements of gingival tissue. The oral healthcare device includes a light emitter and four or more wavelength-sensitive photodetectors configured to detect diffuse reflected light such that associated amplifiers receive lowest possible current differentials. With the large offset part removed before amplification and/or analog-to-digital (AD) conversion, the demands on electronics are relaxed and more accurate gingivitis detection is enabled.

The embodiments and implementations disclosed or otherwise envisioned herein can be utilized with any suitable oral healthcare devices, such as a toothbrush, a flossing device, an oral irrigator, a tongue cleaner, or other personal care device. However, the disclosure is not limited to these oral healthcare devices, and thus the disclosure and embodiments disclosed herein can encompass any oral healthcare device.

Gingivitis, which is an inflammation of the gums, characterized by swollen gums, edema, and redness, is primarily caused by plaque build-up, mostly in the gingival sulcus (pockets). Such gum disease is typically found in areas that are hard to reach, such as interproximal areas between the teeth, and around the back teeth.

Indeed, it is estimated that 50%-70% of the adult population is affected by gingivitis. However, consumers are often unable to detect early signs of gingivitis. Typically, gingivitis progresses until individuals notice their gums easily bleeding when brushing their teeth. Accordingly, gingivitis may only be detected when the disease has already advanced and significantly harder to treat. Although gingivitis is readily reversed by improved oral hygiene, as gingivitis can propagate to irreversible periodontitis it is important to keep good oral health and detect gingivitis as soon as possible.

Gingivitis may be visually diagnosed by detecting reddening and swelling of the gingiva. (see RR. Lobene, et al., "A modified gingival index for use in clinical trials", Clin. Prev. Dent. 8:3-6, (1986) describing a non-contact gingivitis index, based on reddening and inflammation of the gingiva). However, this has limited sensitivity and is highly dependent on the color rendering index of the light-source used. Thus, modern phosphor-converted LEDs can have a low CRI resulting in poor visual judgments.

The reddening of the gingiva is an acute inflammatory response to bacterial biofilm toxins from plaque in the gingivae sulcus or regions along the gum line. This inflammatory response in the short term causes vasodilation, where smooth muscle cells in the arterioles relax, and widen the blood vessels to increase blood supply to the capillary bed. This gives the reddening of the gingiva, and can give a small temperature increase, which is difficult to measure. In addition, the capillaries become more permeable, which results in increased fluid loss from the capillaries to the interstitial spaces, resulting in the swelling of the gums. If the inflammation is chronic, then additional reddening occurs by increased vascularization of the tissue, where additional capillaries may be formed to cope with the additional blood demands of the tissue.

These factors enable detection of gingivitis based on diffuse reflective spectroscopy (DRS). DRS is an optical method that involves emitting, for example, white light towards a target and analyzing spectral properties of the diffuse (rather than specular) reflected light. Due to the different chromophores in the gingival tissue, the spectral properties of the diffuse reflected light clearly differ from those of the source light. As described in T. Hanioka, et al., "Hemoglobin concentration and oxygen saturation of clinically healthy and inflamed gingiva in human subjects", J. Periodontal Res. 25: 93-98 (1990)), increased total-hemoglobin concentration and decreased blood oxygenation can be determined related to gingivitis detection. This method uses six fixed wavelengths and calculates deoxygenated-, oxygenated-, and total hemoglobin concentrations. The latter two are used to calculate oxygen saturation.

Figure 1B:
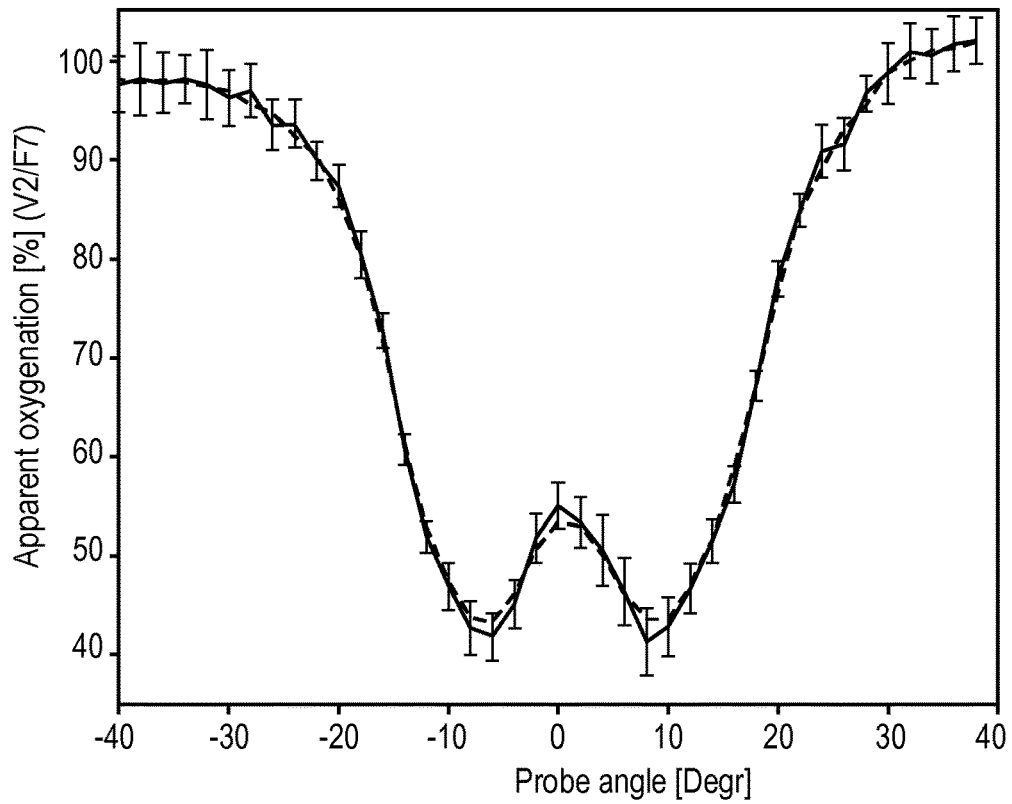
FIG. 1B is a graph of calculated blood oxygenation blood values, in accordance with an embodiment.

FIGS. 1A and 1B show measured DRS spectra using different probe-to-target angles. In FIG. 1B, blood oxygenation values are calculated according to the example method described in Hanioka et al. For angles close to the surface normal, the specular reflection becomes approximately ten times larger than the diffuse component. Thus, as shown in FIG. 1B, the oxygenation values calculated according to this method produce a large variation. The detected specular reflected light can lead to large errors.

Figure 2:
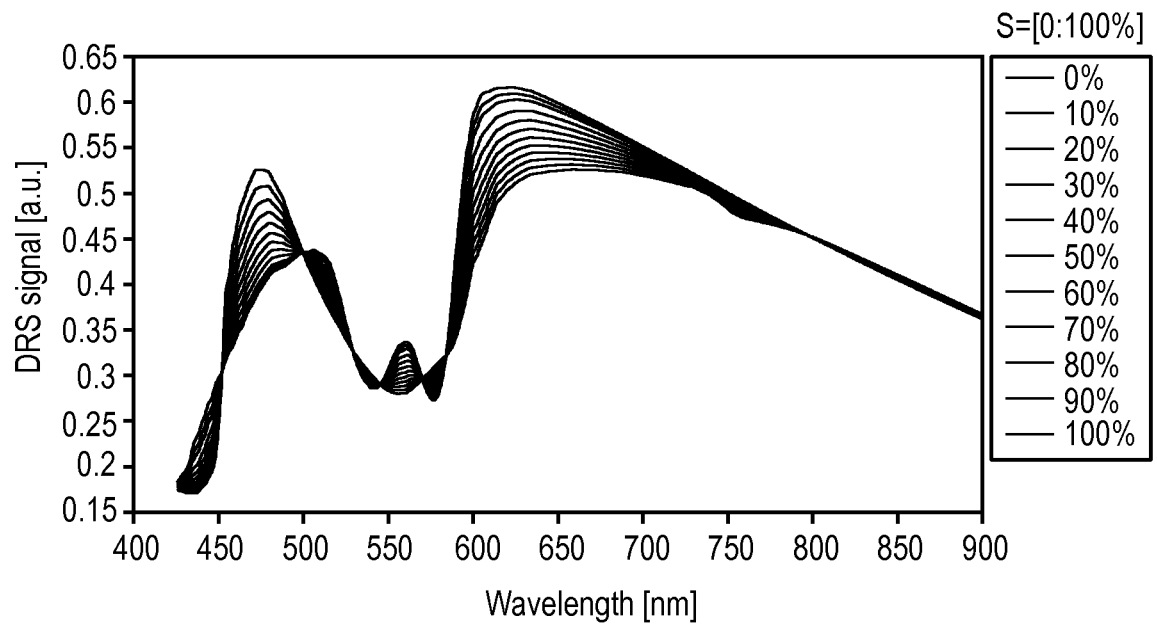
FIG. 2 is a graph of simulated changes in diffuse reflective spectroscopy spectra caused by a tissue oxygenation changing from fully oxygenated to fully deoxygenated, in accordance with an embodiment.

Referring to FIG. 2, it is clear that oxygenation dependent changes in DRS signals can become very small (even without false and/or specular reflections), especially if one is forced to use Near InfraRed (NIR) wavelengths due to sampling depth requirements. FIG. 2 shows simulated changes in DRS spectra caused by a tissue oxygenation changing from fully oxygenated to fully deoxygenated (100%=>0%). In reality, the change will be much smaller: around 10% decrease in oxygenation is expected for gingivitis. No specular reflection is present.

According to embodiments using wavelength detection, some systems include a spectrometer to analyze the spectral shape of the received light. Other systems include a tunable filter (e.g., a MEMS Fabry-Perot filter) on the received and/or emitted light. Although using a spectrometer or a tunable filter is desirable due to the large number of wavelengths available for processing, currently available systems are too big and/or expensive for a consumer product. Alternatively, the received light can be split into different paths and bandpass filters can be applied to achieve the required spectral bands. The previously mentioned, Hanioka method uses six wavelengths and can easily be implemented using the split light embodiment, provided that the large offsets are removed before AD conversion. If not removed, huge dynamic range and analog-to-digital converter resolution is needed.

Since gingivitis detection is based on changes in hemoglobin concentrations, the signal resulting from these changes comprises small modulations on a large offset part caused by other tissue scattering signals (gingivae and dental hard tissue) and specular reflections. The offset part is not DC because of movements; e.g., very small angle changes can result in large specular reflection components. Therefore, the offset part cannot be removed by high-pass frequency filtering. As a result of the large offset, a major part of the dynamic range of the front-end amplifiers and analog-to-digital (AD) converter's resolution is wasted.

Based on the above, a particular goal of utilization of certain embodiments of the present disclosure is to provide a DRS front-end that removes the wasteful large offsets at the earliest possibility in the signal chain.

Figure 3:
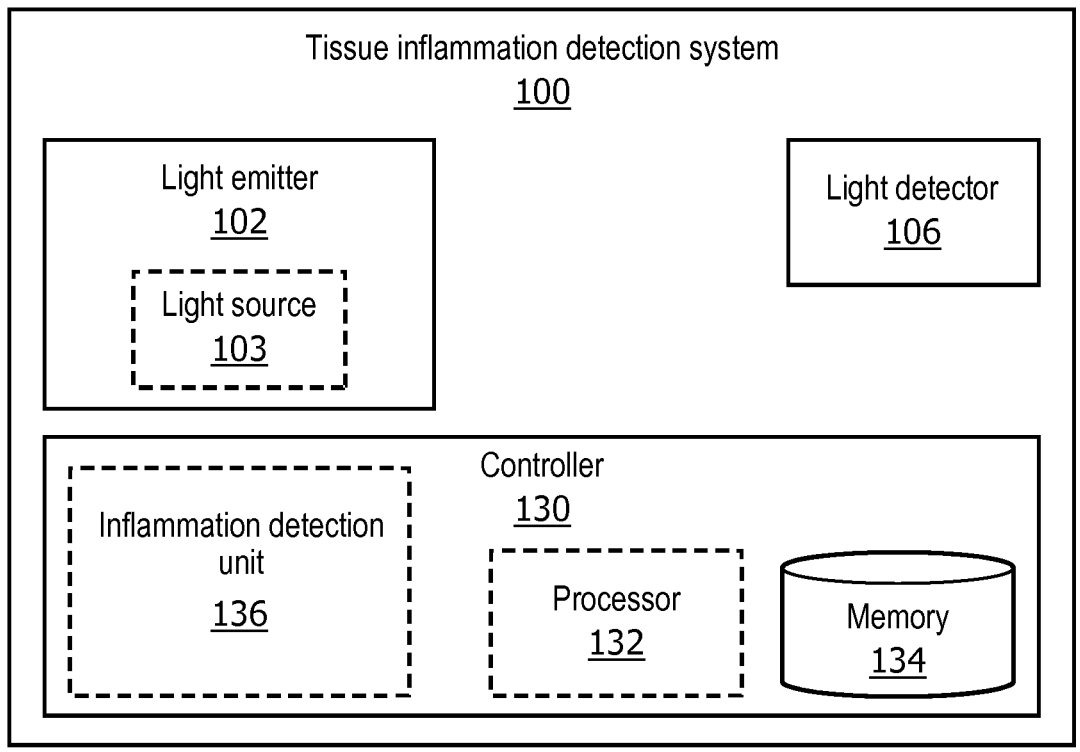
FIG. 3 is a schematic representation of a tissue inflammation detection system, in accordance with an embodiment.
Figure 4:
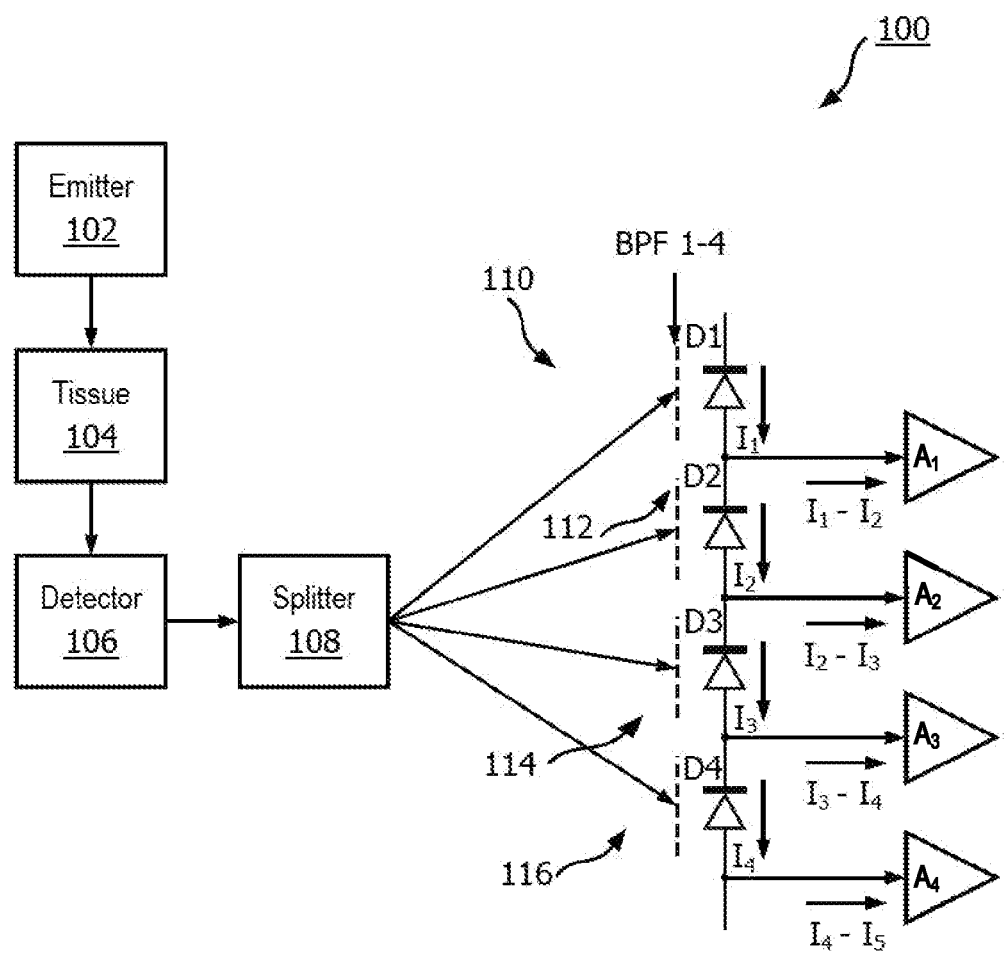
FIG. 4 shows a schematic block diagram of a tissue inflammation detection system including four wavelength-sensitive photodetectors, in accordance with an embodiment.

Referring to FIGS. 3 and 4, in one embodiment, is a system 100 for detecting tissue inflammation is provided. System 100 is configured to remove large offsets before amplification and/or AD conversion. System 100 includes a light emitter (e.g., fiber) 102, a light detector (e.g., fiber) 106, and a controller 130. In an example embodiment, the light emitter comprises a light source 103, for example, a broadband light source 103 such as a phosphor-converted white LED. The light source is coupled into the source fiber to deliver the emitted light to gingival tissue 104. The light detector (e.g., fiber) 106 is configured to pick up diffuse reflected light from tissue 104 and deliver this light.

In an embodiment, the light emitter 102 and the light detector 106 are embodied as a diffuse reflective spectroscopy (DRS) probe having a source-detector distance between 300 µm-2000 µm. Typical configurations include one source fiber next to one detection fiber, one central source fiber surrounded by a plurality of detection fibers, or a single fiber functioning as source and detector simultaneously. An important property of the probe is the source-detection separation because it influences the sampling depth of the probe (i.e., from how deep in the tissue the measured light originates). To detect gingivitis, an average diffuse reflective spectroscopy sampling depth that is greater than 250 µm is required. To obtain such an average, a minimum source-detector distance of approximately 300 µm is required, depending on wavelength.

Since the DRS signal from the detector 106 is normally not a differential signal, additional components are included. According to an embodiment, the detector 106 of the system 100 is configured to deliver the reflected light to a spectral analysis unit or a splitter 108. The splitter 108 is configured to distribute the reflected light over four or more wavelength-sensitive detectors 110, 112, 114, and 116 each having different wavelength sensitivity. Splitter 108 can be a fused fiber splitter, a dispersive splitter (e.g., prism or grating), a light guide manifold, or any suitable alternative.

Each wavelength-sensitive detector 110, 112, 114, and 116 includes a bandpass filter (BPF) in front of a photodiode. As shown in FIG. 4, detector 110 includes bandpass filter BPF1 in front of photodiode D1. Similarly, detector 112 includes bandpass filter BPF2 in front of photodiode D2, detector 114 includes bandpass filter BPF3 in front of photodiode D3, and detector 116 includes bandpass filter BPF4 in front of photodiode D4. Photodiodes are advantageous since they have an expansive linear range and can therefore handle the signals including the large offsets without introducing errors. Although the embodiment of FIG. 4 includes four wavelength-sensitive detectors, other embodiments can include five wavelength-sensitive detectors or more than five wavelength-sensitive detectors.

The photodiodes D1, D2, D3, and D4 are stacked such that the associated amplifiers A1, A2, A3, and A4 receive a current differential, i.e., they receive a much smaller current. This enables a larger amplification which produces a higher and improved signal-to-noise ratio (SNR) for gingivitis detection.

According to an embodiment, the currents $I_1 \ldots I_n$ are arranged in increasing magnitude. Alternatively, the currents $I_1 \ldots I_n$ are arranged in decreasing magnitude. According to another embodiment, the currents are arranged as follows $I_1 < I_2 > I_3 < I_4 > I_5$, etc. (or the other way around). However, the currents are never arranged such that the largest and smallest expected currents are stacked on top of each other. According to an embodiment, the bottom of the stack is terminated with a current source optionally controlled in a closed loop via controller 130. Alternatively, the bottom diode generates a lowest expected photocurrent among the photodiodes. According to another embodiment, the bottom diode generates a photocurrent at a level chosen to minimize the largest of the differentials to be minimized, e.g., at a wavelength expected to give an output near the mean/median level.

Referring to FIG. 4 according to an embodiment, the current differences present at the current-to-voltage amplifiers are nominally minimal and/or balanced around zero. According to another embodiment, the current differences are a predetermined offset in the case of single supply electronics. The output of each wavelength-sensitive photodetector is input to a corresponding amplifier as shown. According to an embodiment, the outputs of the amplifiers are fed into an AD converter (not shown) and because those signals also do not carry the large offset, the useful resolution is much higher. Alternatively, the AD converter can be of a lower resolution which is less expensive advantageously.

The outputs of the AD converter are input to a controller or analyzer having a suitable gingivitis detection algorithm. According to an embodiment, this algorithm includes a gingivitis detection method based on wavelength derivative (slope) signals. According to another embodiment, this algorithm includes a derivative method for calculating tissue oxygenation as described in DE Myers et al., "Noninvasive method for measuring local hemoglobin oxygen saturation in tissue using wide gap second derivative near-infrared spectroscopy", J. Biomed. Opt., Vol. 10(3), (2005). In Myers, a simple continuous wave near-infrared algorithm is described using single depth attenuation measurements at 680, 720, 760, and 800 nm. However, the differential current configuration of the spectral detectors as described above does not have to deliver the same differentials as required by the derivative methods. For example, if the methods require the attenuation measurements at 680, 720, 760, and 800 nm, it does not necessarily follow that the corresponding detectors must be stacked on top of each other. Since the bottom current is known, all currents and therefore new differentials can be calculated internally. This means that the stacking sequence can be chosen such that the current going into the amplifiers are as low as possible. This enables an even higher dynamic range.

Figure 5:
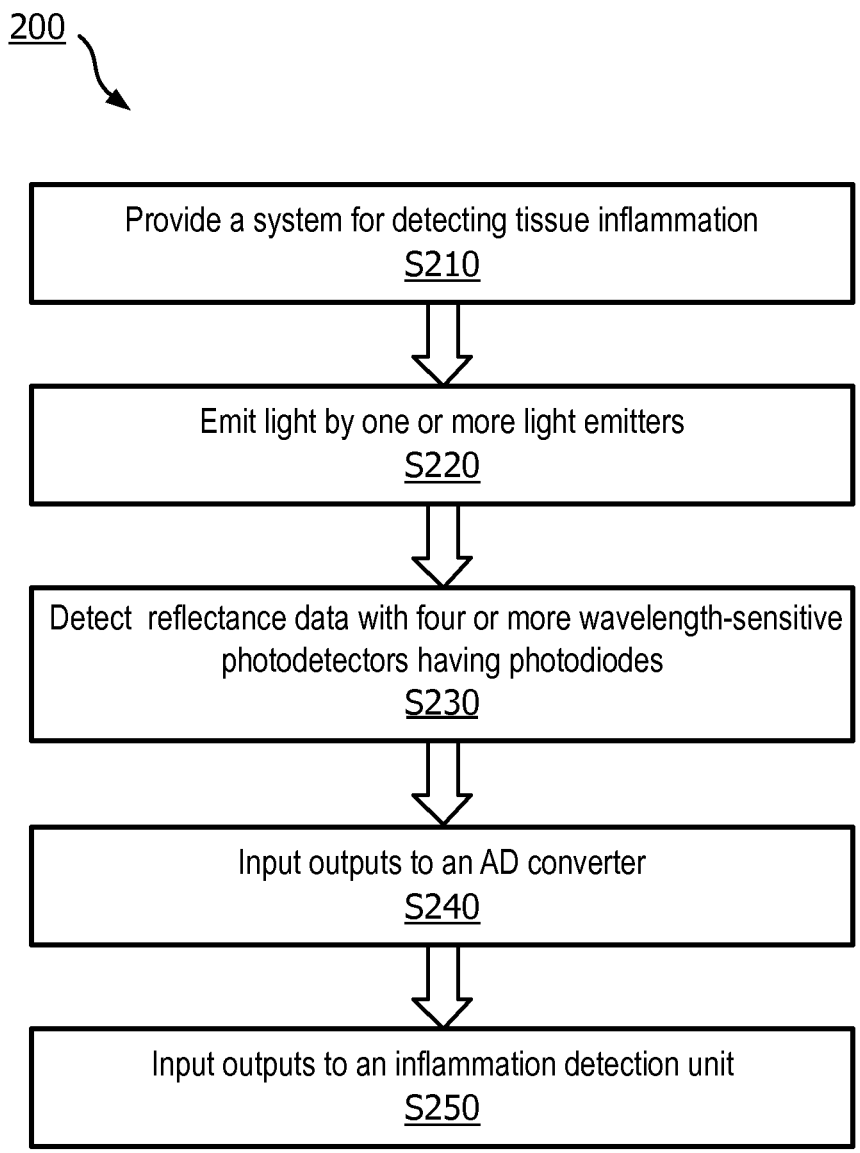
FIG. 5 is a flowchart of a method for detecting tissue inflammation, in accordance with an embodiment.

Referring to FIG. 5, in one embodiment, is a flowchart of a method 200 for detecting tissue inflammation including a front-end for removing specular and DC components directly. In other words, the specular and DC components are removed at the sensor and before sensor front-end electronics. In step S210, a system for detecting tissue inflammation, and gingivitis specifically, is provided. The system may be any of the devices or systems described or otherwise envisioned herein. For example, the system may be system 100, among many other devices or systems. Generally, the system includes a light emitter 102, four or more wavelength-sensitive photodetectors 110, 112, 114 and 116, and a controller 130 configured to carry out the functions described herein. Many other components and configurations are possible.

At step S220 of the method, at least one light emitter 102 emits light, a beam of which impacts the tissue. The light emitted by the light emitter can include two or more wavelengths. Accordingly, the light emitter may comprise one or more light sources 103. The light emitter may emit light periodically or continuously, or may emit light only in response to a trigger. For example, the system detects gingival tissue and activates light emitter 102 to emit light.

At step S230 of the method, the reflected light is distributed over four or more wavelength-sensitive photodetectors 110, 112, 114 and 116 each having different wavelength sensitivity. According to an embodiment, the system 100 includes a splitter 108 configured to distribute the reflected light. The splitter 108 can be a fused fiber splitter, a light guide manifold, or any suitable alternative. The output of each wavelength-sensitive photodetector is input to a corresponding amplifier.

At step S240 of the method, the outputs of the amplifiers are fed into an AD converter. As discussed above, since those signals also do not carry the large offset, the useful resolution is much higher.

At step S250 of the method, the outputs of the AD converter are input to controller 130 or a processor configured to analyze the signals. According to an embodiment, the controller 130 receives the signals where they are analyzed by processor 132 and/or gingivitis detection unit 136 and/or stored in memory 134 for future analysis.

Advantageously, the inventive systems and methods described herein remove large offsets at the earliest possibility after acquiring a diffuse reflective spectroscopy signal such that associated amplifiers receive lowest possible current differentials. With the large offset part removed before amplification and/or analog-to-digital (AD) conversion, the demands on electronics are relaxed and more accurate gingivitis detection is enabled.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A system for detecting tissue inflammation, comprising:
   a light emitter configured to emit light at a tissue region within a mouth of an individual;
   at least four wavelength-sensitive photodetectors configured to detect optical signals diffusely reflected through the tissue region, wherein each of the at least four wavelength-sensitive photodetectors comprises a filter and a photodiode, wherein the photodiodes are configured to convert the optical signals into currents respectively output by the photodiodes, wherein the photodiodes are stacked on top of each other to generate current differential signals from differences between the currents respectively output by adjacent photodiodes;
   at least four amplifiers corresponding to the photodiodes of the at least four wavelength-sensitive photodetectors, wherein the current differential signals are input to the at least four amplifiers corresponding to the photodiodes, wherein the generation of the current differential signals removes unwanted components from the optical signals prior to amplification; and
   a controller configured to detect tissue inflammation at the tissue region based on outputs from the at least four amplifiers.

2. The system of claim 1, wherein the tissue inflammation being detected is gingivitis.

3. The system of claim 1, wherein the light emitter and the at least four wavelength-sensitive photodetectors are embodied in a diffuse reflective spectroscopy (DRS) probe having a source-detection distance between 300 μm-2000 μm.

4. The system of claim 1, further comprising a splitter configured to distribute the reflected optical signals over the at least four wavelength-sensitive photodetectors.

5. The system of claim 4, wherein the splitter is a fused fiber splitter, a dispersive splitter, or a light guide manifold.

6. The system of claim 1, wherein the light emitter is a phosphor-converted white light emitting diode (LED).

7. The system of claim 1, wherein the filter for each of the at least four wavelength-sensitive photodetectors is a band-pass filter.

8. The system of claim 1, wherein the current differential signals from the photodiodes are in increasing magnitude.

9. The system of claim 1, wherein the current differential signals from the photodiodes include first, second, and third current differential signals for the photodiodes, respectively, where the second current differential signal is greater than each of the first and third current differential signals.

10. The system of claim 1, wherein the stacked photodiodes form a stack having a bottom photodiode, and wherein the bottom photodiode is configured to generate a photocurrent at a level to minimize a largest difference of the current differential signals.

11. A method for detecting tissue inflammation, the method comprising:
    emitting light by a light emitter towards a tissue region in a mouth of an individual;
    detecting, via at least four wavelength-sensitive photodetectors, optical signals diffusely reflected through the tissue region, wherein each of the at least four wavelength-sensitive photodetectors comprises a filter and a photodiode, wherein the photodiodes are configured to convert the optical signals into currents respectively output by the photodiodes, wherein the photodiodes are stacked on top of each other to generate current differential signals from differences between the currents respectively output by adjacent photodiodes;
    amplifying the current differential signals via at least four amplifiers corresponding with the photodiodes of the at least four wavelength-sensitive photodetectors, wherein generating the current differential signals removes unwanted components from the optical signals prior to the amplifying;
    digitizing outputs of the amplifiers via an analog to digital (AD) converter; and
    detecting tissue inflammation based on the digitized outputs from the AD converter.

12. The method of claim 11, wherein the tissue inflammation being detected is gingivitis.

13. The method of claim 11, wherein detecting the optical signals comprises distributing the reflected optical signals over the at least four wavelength-sensitive photodetectors with a splitter.

14. The method of claim 13, wherein the splitter is a fused fiber splitter, a dispersive splitter, or a light guide manifold.

15. The method of claim 11, wherein the current differential signals from the photodiodes are in increasing magnitude.

16. The method of claim 11, wherein the current differential signals from the photodiodes include first, second, and third current differential signals for the photodiodes, respectively, where the second current differential signal is greater than each of the first and third current differential signals.

17. The method of claim 11, wherein detecting the tissue inflammation is based on wavelength derivative signals of the current differential signals.

18. A system for detecting tissue inflammation in a human subject, the system comprising:
- a light emitter being configured to emit light at a tissue region within a mouth of the human subject;
- a light detector configured to pick up diffuse reflected light reflected from the tissue region in response to the emitted light;
- a splitter configured to distribute the diffuse reflected light;
- at least four wavelength-sensitive photodetectors configured to receive the distributed diffuse reflected light as optical signals, respectively, wherein each of the at least four wavelength-sensitive photodetectors comprises a filter and a photodiode, wherein the photodiodes are configured to convert the optical signals into currents respectively output by the photodiodes, wherein the photodiodes are stacked on top of each other to generate current differential signals from differences between the currents respectively output by adjacent photodiodes, wherein the generation of the current differential signals removes unwanted components from the optical signals prior to amplification;
- at least four amplifiers corresponding to the photodiodes of the at least four wavelength-sensitive photodetectors, wherein the at least four amplifiers are configured to receive the current differential signals from the adjacent photodiodes of the at least four wavelength-sensitive photodetectors; and
- a controller configured to detect tissue inflammation at the tissue region based on outputs from the at least four amplifiers.

19. The system of claim 18, wherein the splitter comprises a fused fiber splitter, a dispersive splitter, or a light guide manifold.

20. The system of claim 18, wherein the light emitter comprises a phosphor-converted white light emitting diode (LED).

* * * * *